Patented May 24, 1932

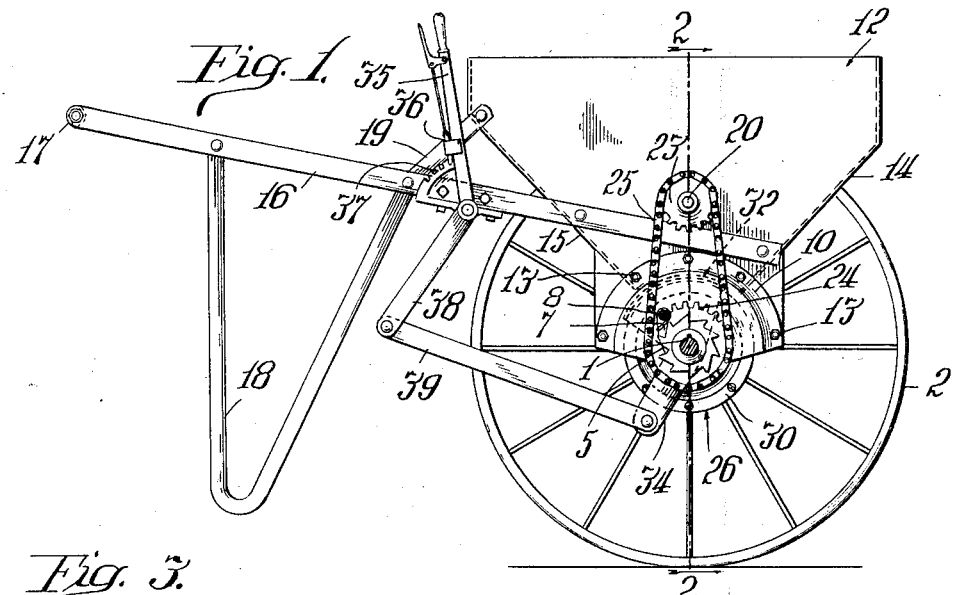
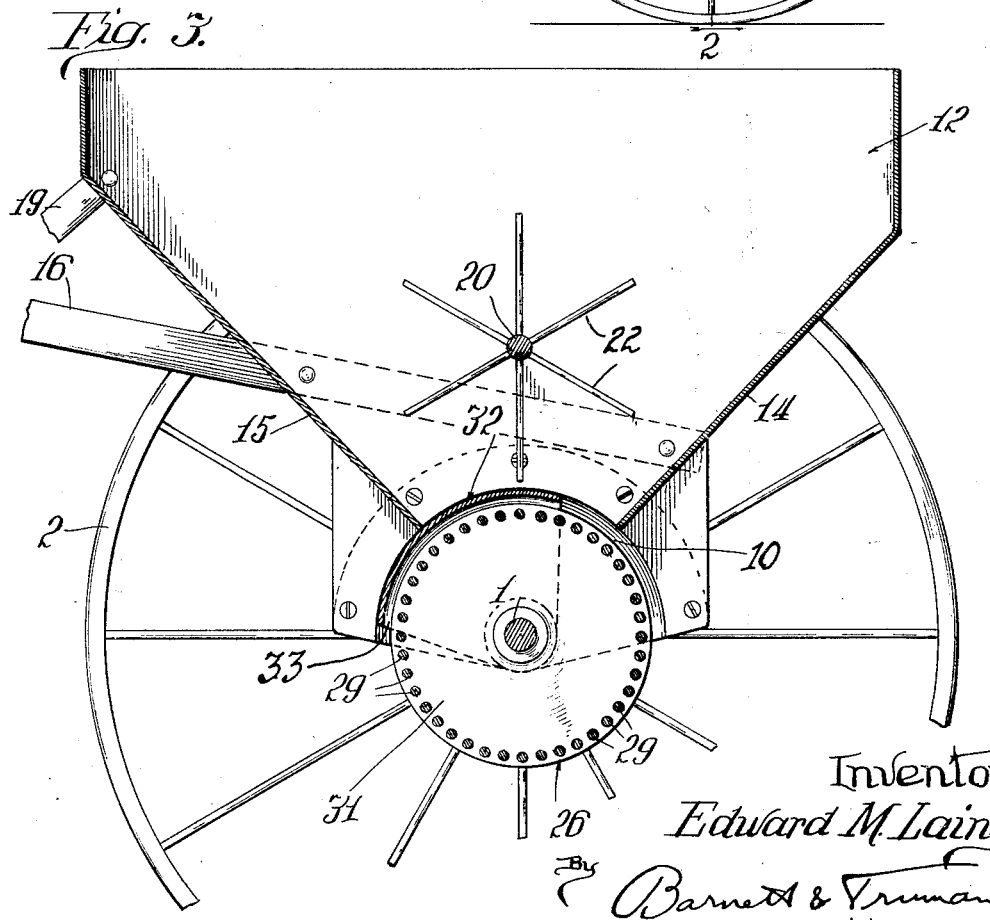

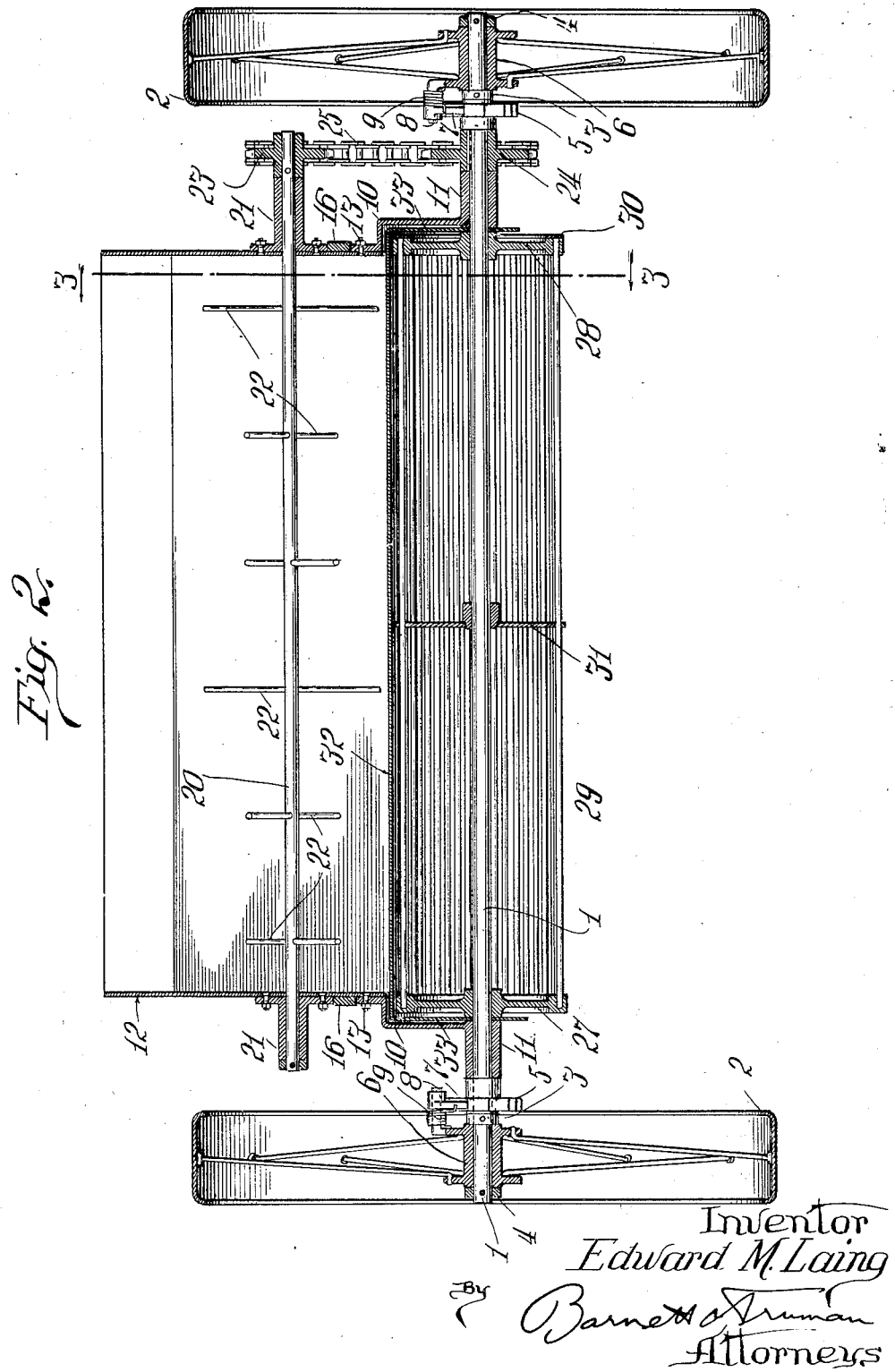

1,859,625

UNITED STATES PATENT OFFICE

EDWARD M. LAING, OF HIGHLAND PARK, ILLINOIS

TOP DRESSING MACHINE

Application filed October 8, 1928. Serial No. 311,215.

This invention relates to a top dressing machine, and more particularly to a machine for spreading a thin even layer of finely divided soil or other material upon the surface of the ground.

The particular example of a machine involving the principles of this invention here disclosed is adapted for spreading a thin layer of screened soil or fertilizer over golf greens. It will be apparent, as the description of the invention proceeds, that the invention may be adapted for numerous similar purposes, some of which will be alluded to in the detailed description which follows.

Briefly described, the machine comprises a rotatable, horizontally positioned cylindrical drum, the cylindrical walls of which are of an open-work construction so that finely divided material fed thereonto from above will be carried through the walls of the cage or drum and distributed in a thin even layer beneath the apparatus.

The general object of the invention is to provide a distributing machine of the type briefly described hereinabove and disclosed more in detail in the specifications which follow.

Another object is to provide an improved rotatable distributor cage having its walls formed of a plurality of spaced parallel rods of circular cross section.

Another object is to provide, in combination with a distributing cage of the type just described, a hopper provided with a rotatable agitator therein, the cage and agitator being geared together to rotate in unison.

Other objects and advantages of this invention will be more apparent from the following detailed description of one approved form of machine embodying the principles of this invention.

In the accompanying drawings:

Fig. 1 is a side elevation of the machine, the wheel on the near side being removed to facilitate the disclosure.

Fig. 2 is a transverse vertical section, on a larger scale, taken substantially on the line 2—2 of Fig. 1.

Fig. 3 is a longitudinal vertical section, on a still larger scale, taken substantially on the line 3—3 of Fig. 2.

The rotatable horizontal axle 1 is supported at its two ends by a pair of similar flat-faced wheels 2, which may be made of metal and of the type commonly used in agricultural implements. Preferably the treads of the wheels 2 will be smooth and of sufficient width so that they will not injure the golf green or other finely kept lawn over which the machine is drawn. The wheels 2 are freely rotatable on the axle 1 between the spacing collars 3 and 4. A ratchet wheel 5 is keyed to shaft 1 adjacent the inner side of the hub 6 of each wheel 2, and a pawl 7 pivotally mounted on a stud 8 projecting from the hub 6 is yieldably held in engagement with the teeth of ratchet 5 by means of a torsion spring 9 or other suitable means. The teeth of ratchet wheels 5 and the pawls 7, point in such directions that when the machine is drawn towards the left (Fig. 1) and the wheels 2 are thus rotated in a counter clockwise direction, the axle 1 will be caused to rotate with the wheels, due to the driving engagement of the pawls 7 with the ratchet wheels 5. However, it will be apparent that these pawl and ratchet connections provide differential means whereby the axle 1 is permitted to rotate in this counter clockwise direction even though either one of the wheels 2 is stationary or rotating more slowly than the axle. In this way, the axle 1, and the apparatus carried thereby, will always be caused to rotate at the speed of that wheel which is traveling the fastest. In other words, when the carriage or machine is being turned on a small radius and the inner wheel is stationary, the axle will rotate with the outer wheel, thus causing the distributing cage hereinafter described to rotate almost continuously.

The carriage of the machine comprises a pair of arcuate end plates 10 supported by bearings 11 mounted on the axle 1. A hopper 12 for carrying the material that is to be distributed is supported by being suitably secured at its ends to the plates 10, as by means of the bolts 13. The bottom walls 14 and 15 of the hopper taper inwardly toward a relatively narrow central discharge opening positioned centrally above the axle 1 and in parallel alignment therewith. A yoke consisting of parallel side arms 16 secured to the end walls of hopper 12, and a forward cross bar or handle 17, provides a means for hauling the machine from place to place. Legs 18, preferably in the form of metal loops secured to and extending downwardly from the side arms 16, serve to support the hopper or load supporting portion of the machine in upright position when the machine is not being moved, in the manner usual in carts of this type. Additional struts 19 may be used between the upper portion of hopper 12 and the side arms 16, to further strengthen the carriage.

An agitator for breaking up the material carried by hopper 12 so as to insure the free flow of this material through the discharge opening may comprise a rotary horizontal shaft 20 mounted at its ends in bearings 21 secured to the outer end walls of the hopper. A plurality of radial arms 22 extend at spaced intervals from the rotary shaft 20, and the shaft 20 is geared to the axle 1 in any suitable manner so that the agitator will be caused to rotate whenever the machine is in motion. In the form here shown, a sprocket wheel 23 keyed on shaft 20 is connected with a sprocket wheel 24 keyed on axle 1 by means of a sprocket chain 25. Any other suitable gearing connection might be substituted for the example here shown.

The hollow cylindrical distributing cage 26 is mounted on axle 1 so as to rotate therewith. The cage comprises a pair of circular end spiders 27 and 28 keyed to axle 1 substantially in the planes of the end walls of hopper 12. The cylindrical walls of the cage are formed preferably by a plurality of metal rods 29 of circular cross section, arranged in spaced parallel relation with their ends mounted in the spiders 27 and 28. At one end the rods 29 are supported in spaced holes or openings extending only partway through the spider 27, whereas the other ends of the rods project into spaced holes which extend entirely through the spider 28. In the latter case, a cover plate 30 is secured on the outer surface of the spider to cover the ends of the rods and hold them in place. It will be understood that either method of securing the rods in place within the spiders could be used at both ends of the drum. The adjacent rods are preferably spaced apart a distance slightly greater than the diameter of one of the rods, although this spacing will be varied in accordance with the material to be distributed. If the drum or cage is of considerable length, one or more additional spiders may be used to support and space the rods 29 at intermediate points, as indicated at 31 in Fig. 2. Preferably, these intermediate spiders will be made as thin as possible so as to reduce to a minimum the interference that might be caused with the even distribution of material projected through the cage. It will be noted that the upwardly presented portion of the cylindrical surface of this cage is positioned within the discharge opening at the lower end of hopper 12.

An arcuate closure or valve 32 is fitted within the discharge opening of the hopper, the valve being carried by end plates 33 pivoted about the axle 1. An arm or crank 34 projecting from one of the end plates 33 forms a means for swinging the valve or closure 32 into or out of position for closing the discharge opening of the hopper. A hand lever 35 is pivotally mounted on one of the arms 16 and provided with a latch 36 cooperating with notched sector 37 for holding the lever in different selected positions of adjustment. Hand lever 35 is connected through lever 38 and link 39 with the arm 34, whereby the valve or closure 32 may be moved to different positions by suitably adjusting the hand lever 35, thus determining the size of the opening through which material is discharged from hopper 12 onto and through the drum or cage 26.

When this apparatus is to be used for top dressing golf greens, the hopper 12 is filled with a proper mixture of screened soil and fertilizer. The carriage is then drawn over the ground to which the dressing is to be applied by means of the handle 17, in the usual manner. By suitably adjusting the hand lever 35, the closure or valve 32 will be opened to an extent sufficient to permit the desired quantity of material to flow from the hopper. As the cart is drawn along, the cage 26 and the agitator 20 will be rotated from the wheels 2, and due to the differential connections between the wheels and axle 1, the rotation of the cage and agitator will be continued as long as either one of the wheels is in motion. The rotating agitator serves to break up the material within the hopper and prevent clogging at the discharge opening. The material will then flow from the discharge opening onto and through the rotating cage. The agitation caused by the rotating agitator and the rotating cage is necessary to provide a flow of material through the discharge opening and through the cage. When the cage and agitator are at rest, as when the carriage or cart is stationary or is being backed, there will be practically no flow of material from the hopper, even though the valve 32 is open. The rotating cage acts to cut or slice off the material passing downwardly from the hopper, and the preferably circular cross-section of the rods 29 and the relatively wide spacing between the rods permits most of the material to pass between the rods and fall upon the rods at the bottom of the cage where it is further broken up and dispersed. There will be very little of the material that sticks to the upper rods and is carried around by the cage and this will fall from the rods when the cage is inverted, and will be knocked off by the material falling through the cage. As a result, there is practically no clogging of the apertures in the cage. The cage serves to thoroughly break up the material and the material falls in a thin even stream or shower corresponding approximately in length to that of the cage and several inches in width. The material is so evenly spread that very little, if any, raking is necessary.

It will be apparent that with slight modifications in size and proportions this spreading apparatus may be used for various purposes other than that here shown by way of example. It may be used for distributing seed, in which case it would usually be preferable to have the rods 29 more closely positioned than in the example here shown. In other words, the spaces between the rods would be narrower, this depending however upon the size of the seeds or other material that is to be distributed.

While other forms of open work cages might be used, the cage having a cylindrical wall formed of spaced parallel rods, as shown, has been found to have many advantages over other screen constructions. The rods are strong and fairly rigid so that the cage will withstand considerable stress without losing its shape, but at the same time adjacent rods can spring apart sufficiently to permit small stones or similar solid objects to pass through the cage without clogging it.

While a small unit, such as disclosed in this application, is well adapted for dressing golf-greens, or similar uses, it is contemplated that a plurality of these units can be hitched together in staggered formation and drawn by a single tractor for seeding, dressing, or fertilizing fairways or other large fields or areas.

I claim:

1. A distributing machine comprising a hopper having a lower discharge opening, a horizontal axle mounted beneath the opening, means for rotating the axle, a distributing cage comprising a plurality of spiders secured to the axle and open-work cylindrical walls carried by the spider, the upwardly presented portion of the cylindrical walls being positioned in the discharge opening, an adjustable valve for controlling the discharge opening, a rotatable agitator within the hopper comprising a horizontal shaft mounted in the end walls of the hopper, and gearing connecting the axle and shaft.

2. A distributing machine comprising a hopper having a lower discharge opening, a horizontal axle mounted beneath the opening, means for rotating the axle, a distributing cage comprising a plurality of spiders secured to the axle and a plurality of horizontal rods supported in spaced parallel relation about the periphery of the spiders to form the cylindrical walls of the cage, the upwardly presented portion of the cylindrical wall being positioned in the discharge opening, an adjustable valve for controlling the discharge opening, a rotatable agitator within the hopper comprising a horizontal shaft mounted in the end walls of the hopper, and gearing connecting the axle and shaft.

3. A distributing machine comprising an axle, a pair of wheels mounted on and supporting the ends of the axle, a cylindrical distributing cage consisting of a plurality of circular spiders mounted on the axle and open-work cylindrical walls carried by the spiders, a carriage frame supported from the axle, a hopper carried by the frame and having a lower discharge opening in which the upwardly presented portion of the cylindrical wall of the cage is positioned, an adjustable valve for controlling the discharge opening, an agitator mounted in the hopper, and means for driving the agitator from the axle.

4. A distributing machine comprising an axle, a pair of wheels mounted on and supporting the ends of the axle, a cylindrical distributing cage consisting of a plurality of circular spiders mounted on the axle and a plurality of horizontal rods supported in spaced parallel relation about the periphery of the spiders to form the cylindrical walls of the cage, a carriage frame supported by the axle, a hopper carried by the frame and having a lower discharge opening in which the upwardly presented portion of the cylindrical wall of the cage is positioned, an adjustable valve for controlling the discharge opening, an agitator in the hopper, and means for driving the agitator from the axle.

5. A distributing machine comprising an axle, a pair of supporting wheels mounted freely on the axle one at each end thereof, one-way driving connections between each wheel and the axle, a cylindrical distributing cage consisting of a plurality of circular spiders secured to the axle, and a plurality of horizontal rods supported in spaced parallel relation about the periphery of the spiders to form the cylindrical wall of the cage, a carriage frame supported by bearing portions mounted on the axle, a hopper carried by the frame and having a lower discharge opening in which the upwardly presented portion of the cylindrical wall of the cage is positioned, an arcuate closure for the discharge opening having supporting arms pivoted on the axle, an adjustable lever mounted on the carriage frame, link connections between the lever and closure, a horizontal shaft pivoted in the end walls of the hopper, agitator arms mounted on the shaft, and gearing connecting the shaft and axle.

6. A distributing machine comprising an axle, a pair of supporting wheels mounted freely on the axle one at each end thereof, one-way driving connections between each wheel and the axle, a cylindrical distributing cage consisting of a plurality of circular spiders secured to the axle, and a plurality of horizontal rods of circular cross-section supported in spaced parallel relation about the periphery of the spiders to form the cylindrical wall of the cage, a carriage frame supported by bearing portions mounted on the axle, a hopper carried by the frame and having a lower discharge opening in which the upwardly presented portion of the cylindrical wall of the cage is positioned, an arcuate closure for the discharge opening having supporting arms pivoted on the axle, an adjustable lever mounted on the carriage frame, link connections between the lever and closure, a horizontal shaft pivoted in the end walls of the hopper, agitator arms mounted on the shaft and gearing connecting the shaft and axle.

7. A distributing machine comprising an axle, a pair of supporting wheels mounted freely on the axle one at each end thereof, one-way driving connections between each wheel and the axle, a cylindrical distributing cage consisting of a plurality of circular spiders secured to the axle, and a plurality of horizontal rods supported in spaced parallel relation about the periphery of the spiders to form the cylindrical wall of the cage, a carriage frame supported by bearing portions mounted on the axle, a hopper carried by the frame and having a lower discharge opening in which the upwardly presented portion of the cylindrical wall of the cage is positioned, an arcuate closure for the discharge opening having supporting arms pivoted on the axle, and means for adjusting the closure.

8. A distributing machine comprising an axle, a pair of supporting wheels mounted freely on the axle one at each end thereof, one-way driving connections between each wheel and the axle, a cylindrical distributing cage consisting of a plurality of circular spiders secured to the axle, and a plurality of horizontal rods supported in spaced parallel relation about the periphery of the spiders to form the cylindrical wall of the cage, a carriage frame supported by bearing portions mounted on the axle, a hopper carried by the frame and having a lower discharge opening in which the upwardly presented portion of the cylindrical wall of the cage is positioned, an arcuate closure for the discharge opening having supporting arms pivoted on the axle, means for adjusting the closure, an agitator mounted in the hopper, and means for driving the agitator from the axle.

9. A distributing machine comprising an axle, a pair of supporting wheels mounted freely on the axle one at each end thereof, one-way driving connections between each wheel and the axle, a cylindrical distributing cage consisting of a plurality of circular spiders secured to the axle, and a plurality of horizontal rods supported in spaced parallel relation about the periphery of the spiders to form the cylindrical wall of the cage, a carriage frame supported by bearing portions mounted on the axle, a hopper carried by the frame and having a lower discharge opening in which the upwardly presented portion of the cylindrical wall of the cage is positioned, an adjustable valve for controlling the discharge opening, an agitator mounted in the hopper, and means for driving the agitator from the axle.

EDWARD M. LAING.